Jan. 26, 1943.  I. T. MILLER  2,309,326
PULVERIZER
Filed Dec. 17, 1940
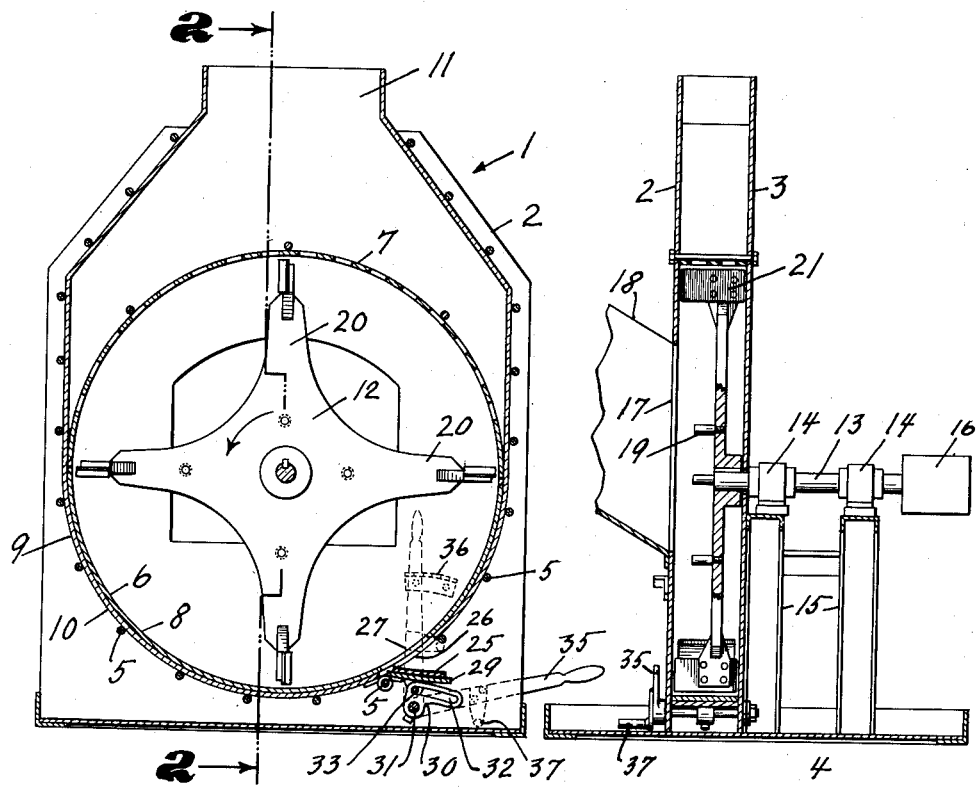
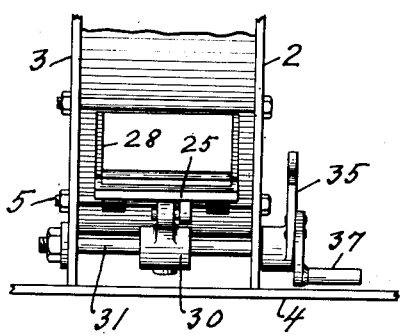
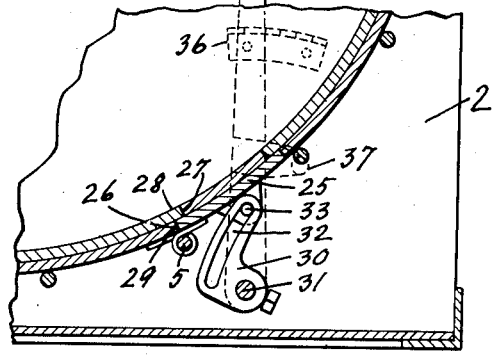
INVENTOR,
IRVEN T. MILLER.
BY
A. Schapp
ATTORNEY.

Patented Jan. 26, 1943

2,309,326

UNITED STATES PATENT OFFICE 2,309,326

PULVERIZER

Irven T. Miller, Modesto, Calif., assignor to Miller Manufacturing Company, Modesto, Calif., a corporation of California Application December 17, 1940, Serial No. 370,471

2 Claims. (Cl. 83—11)

The present invention relates to improvements in a pulverizer, and has particular reference to a safety device to be used in connection with the pulverizer.

My invention has been particularly used and developed in connection with the pulverizer shown in the Elderkin Reissue Patent No. 21,523, issued August 6, 1940.

This pulverizer is intended principally for comminution of agricultural products such as baled hay, baled straw, unbaled hay and straw, grain products, dried fruits and the like, and I find that occasionally metallic objects, such as nails, bolts, wire, rocks, and even glass, will accidentally enter the pulverizer with the products to be comminuted.

Such objects, particularly, if metallic, create a certain fire hazard by being whirled rapidly against the face of the drum used in the pulverizer, thereby producing heat and sparks.

The machine is constructed in such a manner that such objects, if of fairly good size, cannot escape in the normal operation of the machine, and it is proposed in the present invention, to provide a means for causing such objects to escape without the necessity of stopping the machine for manual removal.

More particularly, it is proposed to make provision for a gate in the periphery of the drum forming part of my pulverizer, and to provide for means allowing the operator to quickly open the gate as soon as he is advised by the noise coming from the machine that some foreign object is being whirled around with the material being treated.

It is further proposed to arrange the gate in such a manner as to come flush with the inside of the drum so that it does not offer any obstacle in the normal operation of the pulverizer.

Further objects and advantages of my invention will appear as the specifications proceeds and the novel features thereof will be fully set forth in the claims hereto appended.

The preferred form of my invention is illustrated in the accompanying drawing, forming part of this application, in which:

Figure 1 shows a vertical transverse section through a pulverizer having my invention attached thereto;

Figure 2, an axial section taken along line 2—2 of Figure 1;

Figure 3, a fragmentary view of the lower portion of the machine, looking at it from the side; and Figure 4, an enlarged fragmentary detail view, corresponding to that of Figure 1, but showing the gate in closed position.

While I have shown only the preferred form of my invention, I wish to have it understood that various changes or modifications may be made within the scope of the claims hereto attached, without departing from the spirit of the invention.

Referring to the drawing in detail, my pulverizer 1 may be of any suitable construction, but is preferably made substantially in accordance with the teachings of the Elderkin Reissue Patent hereinabove mentioned. It comprises in its principal structural features, a front plate 2 and a rear plate 3 mounted on the base 4 in spaced and parallel relation and interconnected by a series of tie bolts 5 arranged to serve as support for the drum structure mounted between the plates.

The drum structure includes a drum 6 having an upper section 7, which is perforated, and a lower section 8, which is not perforated, and a shell structure indicated at 9 having a lower section 10 resting on tie bolts 5 and supporting the lower section of the drum, while the upper section of the shell structure rises vertically from the lower section at the sides of the drum and terminates in a suitable discharge indicated at 11.

Inside the drum is provided a rotor 12 mounted on an axial shaft 13, which projects into the drum through the rear plate, and is supported by bearings 14 resting on standards 15. Rotary motion may be imparted to the shaft 13 and the rotor by means of a suitable pulley 16.

The front wall 2 of the pulverizer is formed with an intake opening 17 of considerable size and arranged substantially opposite the center of the drum, a suitable trough 18 leading to the opening from the outside to feed material therethrough.

The rotor 12 is formed as a flat plate presenting a flat face opposite the intake opening, and has a plurality of prongs 19 projecting from said plate at different distances from the center of rotation, but all substantially within the range of the intake opening.

Arms 20 project from the rotor plate in radial direction and terminate in transverse blades 21, which extend to within close proximity of the periphery of the drum. The blades are preferably arranged at a slight angle as compared with the axis of the shaft 13, so as to have a general rearward propelling effect.

The pulverizer thus far described, operates as follows:

Using a bale of hay, by way of example, as the material to be comminuted, the bale is made to slide downwardly on the trough 18 until the forward end of the bale enters the drum and comes to within close proximity of the flat face of the rotor.

The prongs 19 then tear into the front face of the bale, tearing loose bunches of hay and throwing the same outwardly by centrifugal force. The blades 21 drive the hay in a rapid whirling movement through the drum, comminuting the same, and discharging the reduced material through the perforations in the upper drum section and the discharge 11.

If it should happen that a piece of iron, such as a bolt, be fed into the machine accidentally, it would be whirled around along with the hay and dragged along the inner surface of the drum, wearing out said surface and creating excessive heat, or even sparks when striking the walls of the perforations. This creates a fire hazard, particularly insofar as the hay particles discharged from the machine may reach their final destination in a barn or warehouse in heated condition to form a possible source of spontaneous combustion.

To remedy this situation, I provide the gate 25, which is mounted in a peripheral drum section and which may be opened by an attendant very quickly when he becomes aware of the presence of a metallic or other solid object in the drum by the noise it makes in the whirling movements.

The gate is preferably mounted in the lower drum section and may be hinged to one of the tie bolts 5, previously mentioned. It is designed to open in the direction of rotation of the rotor, so that any solid bodies whirled around by the rotor will find an easy exit through the gate opening.

In providing a gate of this type, it is essential that when closed, it comes flush with the inside of the drum and be firmly held in closed position. It is further essential that it should be constructed so as to open quickly and to be operable from a point at the machine where the operator is most likely to be.

To insure flushness in the inner drum face, and perfect seating of the gate, I make the opening 26 in the shell structure somewhat larger than the opening 27 in the drum, so as to provide an inner margin 28. I construct the gate 25 with an outer configuration corresponding to that of the opening and to provide a flange 29 adapted to bear on the flange or margin 28, with the inner face of the gate coming flush with the inner face of the drum, and the outer face of the gate coming flush with the outer face of the shell structure.

For operating the gate, I provide a bracket 30 pivoted on a cross-member 31 below the gate, and having a slot 32 adapted to receive a pin 33 mounted in a bracket rising from the gate. As will be seen from the drawing, when the bracket 30 is swung on its pivot in one direction or another, the gate will be opened or closed.

The bracket 30 is operated by means of a handle 35 mounted on the pin 31 on the outside of the front plate 2, and near the feed trough, so as to be within convenient reach of an attendant feeding material into the drum.

The lever may be made to operate against a suitable ratchet 36 for locking the lever in position when the gate is closed. The lever is also preferably provided with a foot piece 37, which allows the same to be operated by the foot of the attendant.

It is apparent that any other suitable kind of operating means and of remote control for the same, may be substituted for the one shown in the drawing.

In operation, the gate remains closed during the normal use of the machine, and is firmly held in closed position by the lever 35 engaging with the ratchet 36. When a heavy piece of foreign matter has entered the drum and begins to pound against the wall, the operator may instantaneously open the gate by operation of the lever 35.

The heavy piece of iron or the like will then be driven out by centrifugal force, whereupon the operator may close the gate, and then continue the operation of the machine without interruption.

The gate may also become useful under other conditions as for instance, if material too wet for proper comminution has been fed into the machine and threatens to clog it. The opening of the gate will allow such material to be removed without effort, and will clean the machine for continuation of normal operation in a very short time.

I claim:

1. In a pulverizer, a cylindrical drum having a perforated upper drum section and an imperforate lower drum section and having a gate opening in the lower section, a rotor revolvable in the drum, an intake for the drum, means on the rotor whereby material fed through the intake is whirled against the drum and comminuted and discharged through the perforations, a gate for the opening hinged at an edge of the opening so as to open outwardly, with the hinge located at the forward edge of the gate with respect to the direction of material travel and the gate so constructed as to be flush when closed with the imperforate interior drum face, and manual lever means for swinging the gate to open position.

2. In a pulverizer, a cylindrical drum having a perforated upper drum section and an imperforate lower drum section and having a gate opening in the lower section, a rotor revolvable in the drum, an intake for the drum, means on the rotor whereby material fed through the intake is whirled against the drum and comminuted and discharged through the perforations, a gate for the opening hinged at an edge of the opening so as to open outwardly, with the hinge located at the forward edge of the gate with respect to the direction of material travel and the gate so constructed as to be flush when closed with the imperforate interior drum face, and manually actuated means for swinging the gate to open position.

IRVEN T. MILLER.